Oct. 14, 1952        H. ZIEBOLZ ET AL        2,613,502
POSITIONING CONTROL SYSTEM FOR REMOTE ELEMENTS, INCLUDING
HYDRAULIC TRANSMISSION UNITS
Filed Jan. 25, 1946        2 SHEETS—SHEET 2

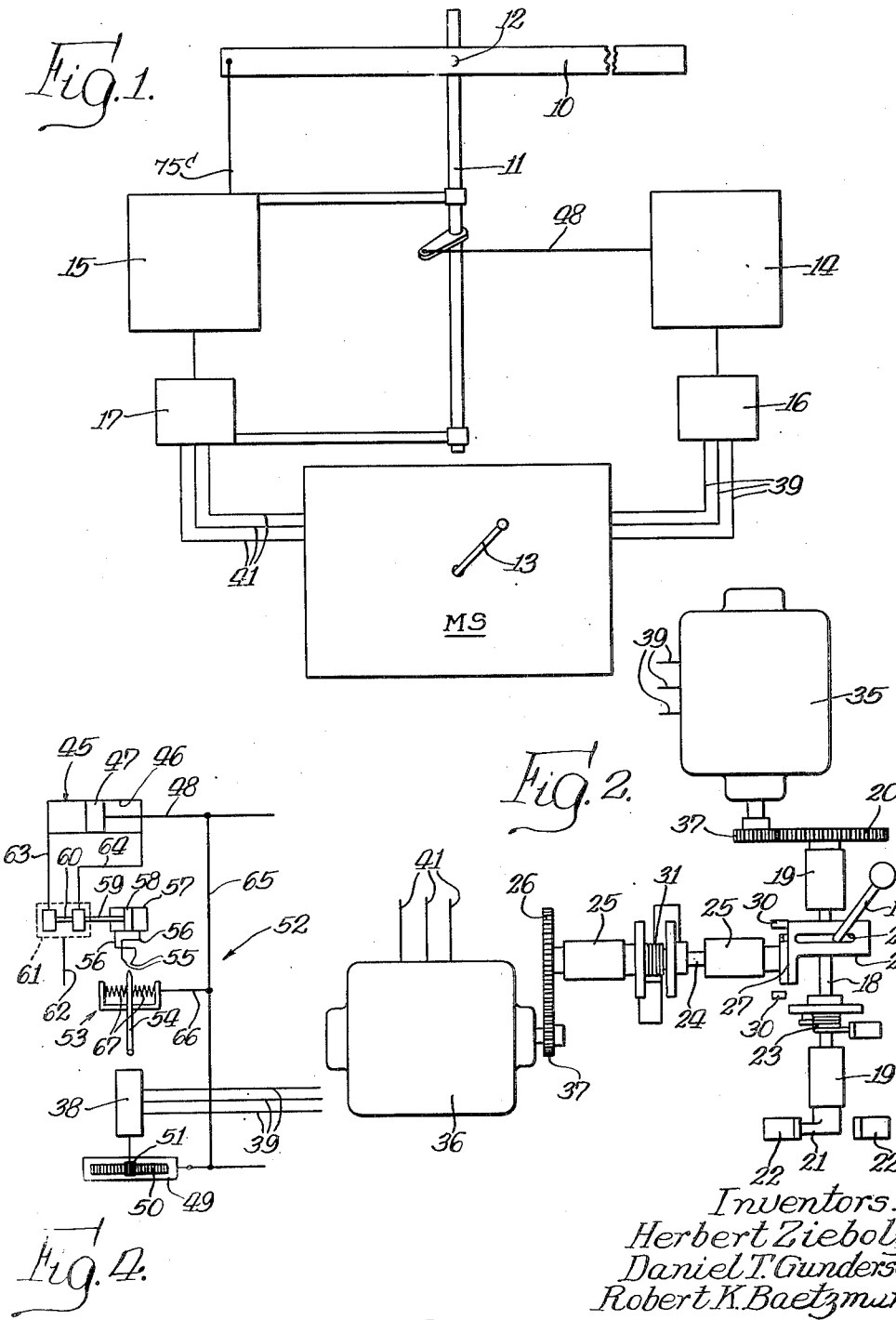

Inventors:-
Herbert Ziebolz,
Daniel T. Gundersen,
Robert K. Baetzmann,
By Chritton, Schroeder, Merriam & Hofgren Attys.

Patented Oct. 14, 1952

2,613,502

UNITED STATES PATENT OFFICE 2,613,502

POSITIONING CONTROL SYSTEM FOR REMOTE ELEMENTS, INCLUDING HYDRAULIC TRANSMISSION UNITS

Herbert Ziebolz, Daniel T. Gundersen, and Robert K. Baetzmann, Chicago, Ill., assignors to Askania Regulator Company, Chicago, Ill., a corporation of Illinois Application January 25, 1946, Serial No. 643,420

11 Claims. (Cl. 60—53)

The invention relates generally to remote control systems and more particularly to systems for accurately controlling the position of a member from a remote station.

One object of the invention is to provide a new and improved remote position control system which is rapid yet accurate in operation.

Another object is to provide a system for controlling the movement and final position of a member from a remote point having power means for imparting movement to the member, a manually actuated member whose movements and position are to be duplicated by the controlled member, and control means, responsive to departure of the member to be controlled and the manual member from corresponding positions, functioning to bring about full rate of operation of the power means for any relative departure of the members from corresponding positions beyond a certain minimum departure.

Another object is to provide a system for controlling the movement and final position of a member from a remote point having power means for imparting movement to the member, a manually actuated member whose movements and position are to be duplicated by the controlled member, and control means, responsive to departure of the member to be controlled and the manual member from corresponding positions, functioning to bring about a rate of operation of the power means which is proportional to the departure of the members from corresponding positions when such departure is below a certain minimum and a full rate of operation for any departure beyond that minimum.

Still another object is to provide a system for controlling the final position of a member from a remote point having power means for driving the member, a manually actuated member whose position it to be duplicated by the driven member, and control means, responsive to departure from correspondence in position of the members to render the power means operative, including a controller for the power means and a regulator for the controller responsive to the departure from relative correspondence in position of the members and to the position of the controller.

Yet another object is to provide a control system of the character described immediately above in which the controller is capable, by acting through the regulator, of arresting its own movement short of producing full rate of operation of the power means only for certain small movements of the manually actuated member.

A further object is to provide a control system for governing the position of a member movable in a plurality of basic directions to duplicate the position of a control member, having electrical signal transmitting means at the master station, means at a remote station for receiving the signal and converting the same into mechanical movement for control of a power means driving the member to be controlled and into movement in part, at least, neutralizing the converted signal and means partaking of the movement of the member to be controlled connected completely to counteract the converted signal as the controlled member reaches the called-for position.

Other objects and advantages will become apparent from the following detailed description taken in connection with the accompanying drawings, in which:

Fig. 1 is a box type diagrammatic illustration of a remote control system embodying our invention.

Fig. 2 is an enlarged detailed and still partially diagrammatic view of the master station of Fig. 1.

Fig. 4 is an enlarged, detailed and still partially diagrammatic view of the other of the power means and the portion of the control therefor located remotely from the master station.

Figure 3:
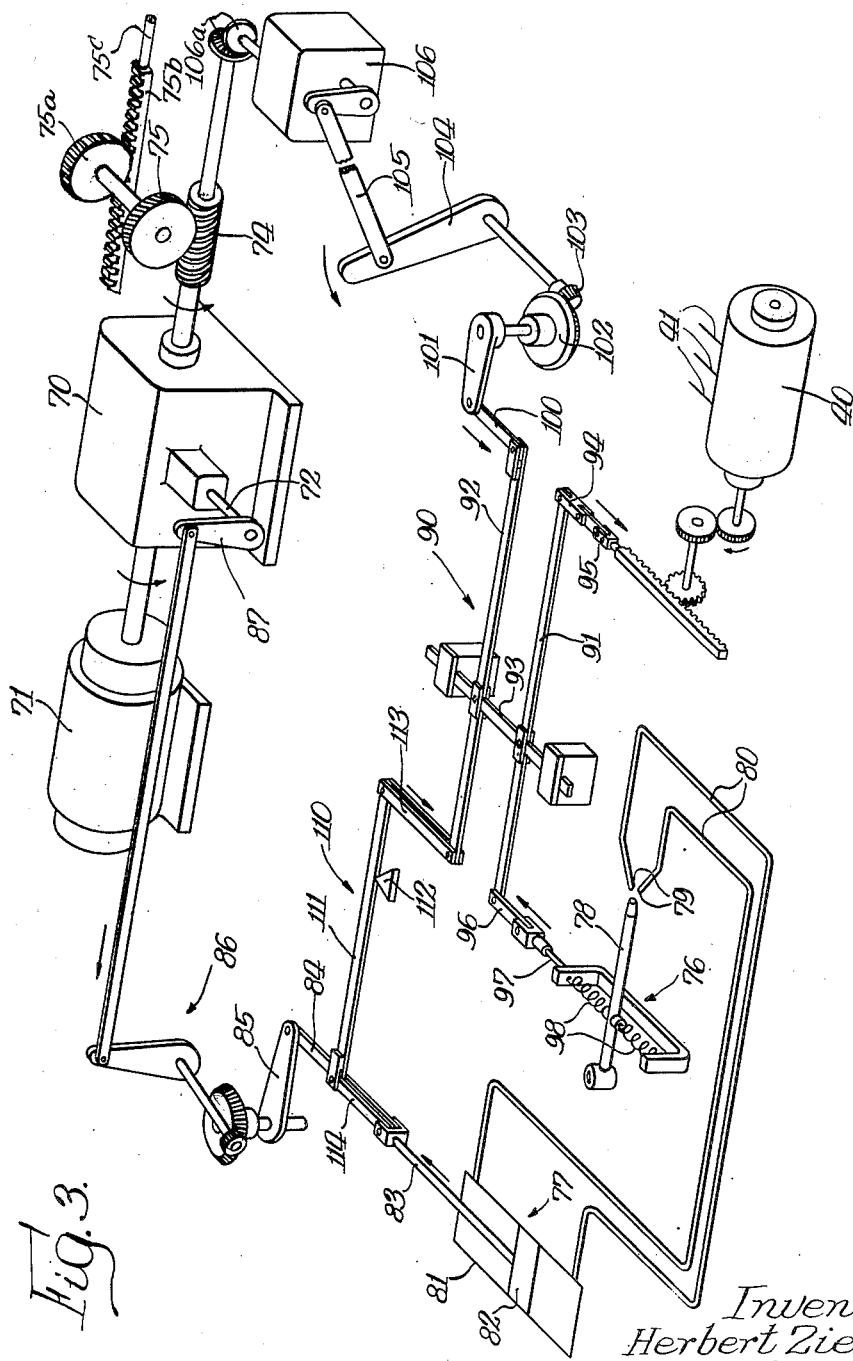
Fig. 3 is an enlarged detailed and to a slight degree still diagrammatic view of one of the power means and the portion of the control therefor located remotely from the master station.

While the invention is susceptible of various modifications and alternative constructions, it is herein disclosed and will hereinafter be described in a preferred embodiment. It is not intended, however, that the invention is to be limited thereby to the specific construction disclosed. On the contrary it is intended to cover all modifications and alternative constructions falling within the spirit and scope of the invention as defined in the appended claims.

For purposes of disclosure, the invention is herein disclosed as adapted to the control of a remotely located member, the control exercised being over the movements of the member but primarily over the final position of the member. While the controlled member might take a variety of forms, it is, for purposes of disclosure solely, here represented at 10 in the form of the arm or beam of a crane for charging and discharging a steel furnace. The member 10 is intended to have movement in at least two basic directions. Herein one of these movements will for convenience be a rotation of the member 10 about an axis represented at 11 and lying in the plane of the drawing, as viewed in Fig. 1. The other movement will be a pivotal movement about an axis 12 disposed at right angles to the drawing. It is to be understood that the term "basic direction" of movement is intended to include movement of the member in both directions from a given point while still having the same fundamental movement relative to one of the axes. Thus the member 10 may be pivoted either clockwise or counterclockwise, as viewed in Fig. 1, and be performing one of the basic movements; and it may be rotated in either direction about the axis 11 and be performing the other basic movement.

Located remotely from the controlled member 10 is a master station MS which includes a control member 13 whose movements and positions are to be simulated or duplicated by the controlled member 10. The member 10 is driven in one of its basic directions by a power means 14 and is driven in its other basic direction by a power means 15. Positioned adjacent the power means 14 is a control means 16 and similarly located adjacent the power means 15 is a control means 17, both being adapted to receive a signal transmitted from the master station and operable to convert that signal into control of the controlled member 10.

Herein, depending upon the movement given to the control member 13, either of the power units 14 and 15 may be driven alone so as to obtain a resultant movement of the controlled member 10 in one only of the basic directions, or both power units may be operated simultaneously with resultant movement of the controlled member 10 in a direction resulting from addition of the various components of movement in the basic directions. The control is such that the member 10 is swiftly yet accurately brought to the desired position, herein a position duplicating or simulating that of the control member 13, without overrunning. In one basic direction of movement, the system herein disclosed is adapted to drive the member 10 at the maximum rate for substantially any departure of the control and the controlled members from corresponding positions while in the other basic direction of movement the member is adapted to be driven at a rate proportional to the departure of the members from a corresponding position only for small departures, and for any larger departures is adapted to be driven at or near the maximum rate of operation of the power unit.

Master station

The master station, as more particularly disclosed in Fig. 2, includes, as already stated, the control member 13 which, as seen from Fig. 2, takes the form of a stick similar to that found in small aircraft and commonly referred to as a "joystick." The member 13 is nonrotatably secured at one end to a rockable shaft 18 journaled in the bearings 19 and carrying nonrotatably affixed to one end thereof a gear 20 and nonrotatably affixed to the other end a crank arm 21. Disposed on opposite sides of the shaft 18 in position to be engaged by the crank arm 21 are a pair of stops 22 which thus serve to limit the extent of permissible rotation of the shaft 18. Secured to the shaft 18 is a torsion spring 23 operable to urge the shaft 18 in one direction so as to tend to restore the member 13 to an "at rest" or "normal" position.

While nonrotatably affixed to the shaft 18, the member 13 is pivotally affixed so that it may swing in a plane passing through the axis of the shaft 18 and thus has movement in two basic directions and in paths composed of components of such basic movements. Disposed at right angles to the shaft 18 is a second shaft 24 journaled in a pair of bearings 25. At one end this shaft also carries a gear 26 and at the other end carries a bracket-shaped crank arm 27 projecting over the shaft 18 at the point of attachment of the control member 13 thereto. Both the gear 26 and the crank arm 27 are, of course, fast on the shaft 24 and the crank arm 27 has formed in its axially extending portion 28 a slot 29 through which the control member 13 projects. The slot 29, of course, extends parallel with the shaft 24 and at right angles to the shaft 18 in order that the control member 13 may be actuated to rock the shaft 18 without rocking the shaft 24 and, likewise, in any position of the shaft 18 may rock the shaft 24 without altering the position of the shaft 18. Stops 30 are positioned on opposite sides of the shaft 24 to be abutted by the crank arm 27 and limit the extent of rocking of the shaft 24. Secured to the shaft 24 and operating to urge the same to a neutral position is a torsion spring means 31.

Inasmuch as the controlled member 10 and the power means for driving the same are located remotely from the master station, the rotation of gears 20 and 26 produced by movement of the control member 13 cannot readily be transmitted to the control means 16 and 17 by mechanical connections. It becomes necessary, therefore, to employ more flexible, more readily extensible connections which at the same time, however, very precisely and accurately transmit the movements of the gears 20 and 26. While, no doubt, a variety of such movement or signal transmitting means might be employed, herein electrical means are utilized. More particularly, a self-synchronous system is employed in both instances and to that end there is located at the master station a first transmitter 35 of the rotary multiple phase voltage varying type geared to be driven from the shaft 18, and a second transmitter 36 of the rotary multiple phase voltage varying type geared to be driven from the shaft 24. In both instances the transmitters have nonrotatably secured to the armature shaft a gear 37 substantially smaller than the gears 20 and 26, so that rocking of the shafts 18 and 24 will be amplified. The self-synchronous systems are completed by a receiver 38 of the same construction as the transmitters but acting as a motor (see Fig. 4) connected by suitable leads 39 with the transmitter 35 and a receiver 40 of the same construction as the transmitters but acting as a motor (see Fig. 3) connected through suitable leads 41 with the transmitter 36.

First power means and control means

Frequently, as here, the mounting of the controlled member 10 is such that there is no tendency of the member whether loaded or unloaded to have any movement in one of its basic directions of movement. Herein this free and unbiased movement is rotation of the member 10 about the axis 11. The power means 14, under such circumstances, may be comparatively simple in character and herein comprises a motor 45 connected directly to the means forming the axis 11 of the member 10. The motor 45 herein is a hydraulic motor, more particularly, a reciprocatory motor comprising a cylinder 46 and a piston 47, the latter having a rod 48 for engagement in a suitable driving manner with the means forming the axis 11 of the member 10.

The control means 16 for the motor 45, as already stated, includes the self-synchronous receiver 38 which is operable to convert the signal transmitted by the self-synchronous transmitter 35 into a signal or indication that is utilized for the control of the motor 45. Herein this indication is in the form of linear movement of a slide 49 driven through the medium of a rack 50 and pinion 51 from the self-synchronous receiver 38. This movement together with that of the controlled member 10, herein the movement of the piston 47, is through a linkage system 52 utilized to control a regulator, generally designated 53, which in turn controls the motor 45. The regulator 53 is of the jet type having a pivoted jet pipe 54 supplied in a conventional manner with fluid under pressure and adapted to discharge against a pair of orifices 55 which are by conduits 56 connected to opposite ends of a cylinder 57 of a power multiplying means. Reciprocable within the cylinder 57 is a piston 58 connected by a piston rod 59 to the valve element 60 of a spool valve 61. The valve has a supply conduit 62, a conduit 63 leading to the head end of the cylinder 46 and a conduit 64 leading to the rod end of the cylinder. The valve 61 functions in well known manner to supply fluid under pressure to the rod end of the cylinder and to exhaust it from the head end of the cylinder when the valve element 60 is shifted to the right from the position shown in Fig. 4, and vice versa when the valve element 60 is shifted to the left from its position shown in Fig. 4. It will be appreciated that, due to the arrangement of the conduits 56, 63 and 64, the piston 47 is shifted in a direction opposite to that in which the jet pipe 54 is pivoted.

In turn governing the regulator 53 to cause the motor 45 to impart to the controlled member 10 the movement called for by the control member 13 is the linkage system 52. This system comprises a beam-like link 65 pivotally connected at one end to the element 49 and pivotally connected at the other end to partake of a movement proportional to the movement of the controlled member. Herein the link 65 is shown connected directly to the piston rod 48 though it is to be appreciated that, depending upon the magnitude of movement of the element 49 and the magnitude of movement of the piston 47, a movement amplifying or reducing means may have to be incorporated. Pivotally attached to the link 65 at its approximate midpoint is a link 66 which at its free end and through the medium of springs 67 engages the jet pipe 54 on opposite sides to swing the same through its very limited movement about its pivot. The springs 67 function in known manner to take up movement of the link 66 beyond the permissible movement of the jet pipe 54.

The operation of the control means will be readily understood. If it be assumed that the signal received by the self-synchronous receiver 38 is such as to cause movement of the element 49 to the right, as viewed in Fig. 4, the link 65 will initially pivot about its point of attachment to the piston rod 48 and thus will move the link 66 to the right pivoting the jet pipe 54 clockwise and thus causing the piston 58 of the power multiplying means 53 to shift to the right. This in turn shifts the valve element 60 to the right thereby in turn causing the piston 47 of the motor 45 to shift to the left swinging the controlled member 10 and also the link 65 still in a counter-clockwise direction, as viewed in Fig. 4. The result, of course, is that the link 66 is by the movement of the element 49 shifted in one direction and by movement of the piston rod 48 shifted in the opposite direction, displacing the jet pipe 54 from its neutral position with the initial movement of the element 49 and restoring it to neutral position as such initial movement of the element 49 is compensated for or offset by corresponding movement of the controlled member 10. Initial movement of the element 49 in the opposite direction causes like but reversed operation. The rate of movement of the controlled member 10 will, of course, be proportional to the rate of movement or operation of the motor 45 and this, with the arrangement here shown, is a maximum for substantially any departure of the control and controlled members from corresponding positions, for any departure pivots the jet 54 from neutral and thus shifts the valve 60 to full open position. When the member 10 reaches its proper position, the jet 54 is restored to neutral, the valve 60 is restored to neutral, and movement of piston 47 and of member 10 is arrested.

*Second power means and control means*

Whereas the power means 14 is of simplified design, is more or less directly connected to the member 10, and is controlled to be driven at a maximum rate for any departure of the control and the controlled members from corresponding position save the very slightest, for which the rate is proportional to the extent of departure, the power means 15 is of a much more highly developed character and functions to drive the member 10 at substantially the maximum rate of operation of the power means for all departures of the members from corresponding position save very small departures during which the rate again is proportional to the departure so as to obtain an accurate positioning of the controlled member without overrunning. To that end, the power means comprises a hydraulic transmission 70 of any well known manufacture and purchasable as a unit upon the market. Such a hydraulic transmission comprises a pump adapted to be driven by a motor 71, usually electric, and a hydraulic motor driven by fluid from the pump and some adjustable means determining the rate and the direction at which the hydraulic motor is driven from the pump. Herein the last mentioned means has, for control thereof, a rockable shaft 72 projecting outwardly of the transmission housing. In order that the drive for the member 10 may be self-locking, there is incorporated intermediate the transmission and the member 10 a worm 74 and a worm wheel 75. This obviates the necessity of separate braking means for holding the member 10 against movement by, for example, the load carried thereby. The drive for the member 10 may be completed, for example, by a pinion 75a fast with the worm wheel 75 and a rack 75b meshing with the pinion and terminating at one end in a rod 75c connected to the member 10.

The control means 17 for the power means 15, as already stated, includes the self-synchronous receiver 40. The control means 17 also includes a regulator, generally designated 76, a controller, generally designated 77, governed by the regulator 76 and in turn controlling the power means, and a linkage system actuated by the control and the controlled members and by the controller 77 to govern the regulator 76. The regulator 76 is of the jet type having a pivoted jet pipe 78 supplied in well known manner with fluid under pressure and discharging the same against a pair of orifices 79. The orifices are by conduits 80 connected to ports of the controller 77 which herein takes the form of a cylinder 81 and a piston 82 reciprocable therein. Secured to the piston 82 and projecting through one end of the cylinder is a piston rod 83. This rod is by a link 84 connected to an arm 85 of a motion converting and transmitting system, generally designated 86, terminating at its other end in a similar arm 87 fast on the end of the control shaft 72. It will be appreciated that the system 86 merely serves to produce the type of movement required for the control of the particular hydraulic transmission 70 employed and that this system will either vary, or in some instances may be eliminated depending upon the make of hydraulic transmission employed.

The linkage system governing the regulator comprises a first linkage unit, generally designated 90. This linkage unit is actuated by the control member 13 and the controlled member 10 and functions to retain the jet pipe 78 of the regulator 76 in neutral position so long as there is no departure of the members from correspondence of their positions. To that end, the unit comprises a pair of similar links 91 and 92 disposed generally parallel of one another and each pivotally mounted intermediate its ends on a slidable link 93. One end of the link 91 is through a short link 94 connected to a slidable element 95 driven through a rack and pinion from the receiver 40 and thus representing by linear movement the signal sent by the transmitter 36, and, carried a step farther, representing the movement of the control member 13 in one of its basic directions of movement. The other end of the link 91 is by a short link 96 connected to an actuator 97 for the jet pipe 78. The actuator 97 includes a pair of compression springs 98 constituting the actual elements bearing against the jet pipe 78 so as to be capable of yielding should the movement of the actuator 97 by the link 91 be greater than the limited permissible pivoting of the jet pipe 78.

The right-hand end of the link 92, as viewed in Fig. 3, is connected to be actuated by the controlled member 10. To that end, the link 92 is by a short link 100 connected to an arm 101 mounted to rotate with a bevel gear 102. Meshing with the bevel gear 102 is a second bevel gear 103 mounted to rotate with an arm 104 connected by a link 105 to a reducer 106 designed to reduce rotations of the output shaft of the transmission, to which it is connected by bevel gears 106a, to motion of appropriate character and scope to cause the movement of the arm 101 to bear the same relationship to the movement of the controlled member 10 that the element 95 bears to the movement of the control member 13. It will be seen, therefore, that the linkage unit 90 as actuated by the members 10 and 13 maintains the regulator 76 in neutral position when the positions of the control and the controlled members correspond. With any departure of the members from correspondence of positions, the jet pipe 78 is pivoted to effect shifting of the controller 77.

Completing the linkage system is a second linkage unit, generally designated 110. This linkage unit is actuated by the controller 77 and acts on the regulator through the linkage unit 90. Herein the action of the controller 77 through the linkage unit 110 is such as to bring about a premature or anticipatory return of the regulator to neutral position. Moreover, the controller 77 and the movement transmitting means 86 are so designed that movement of the piston 82 from an intermediate position in the cylinder to either end of the cylinder produces full rate of operation of the transmission 70. The linkage unit 110 comprises a link 111 in the form of a beam pivoted on a fulcrum 112 located very close to one end of the link 110. The short arm of the link 110 is by a link 113 connected to the remaining end of the link 92 of the first linkage unit 90, while the long arm of the link 110 is by a link 114 connected to the piston rod 83.

As shown in Fig. 3, movement of the jet pipe 78 in a counterclockwise direction, for example, results in supply of fluid to the head end of the cylinder 81 and thus causes movement of the piston 82 and its rod 83 in a generally upward direction, as viewed in Fig. 3. Assuming the element 95 and the arm 101 stationary, this upward movement of the rod 83 results in a movement of the actuator 97 tending to rotate the jet pipe 78 in a clockwise direction and thereby the controller 77 may, under certain conditions, bring about restoration of the regulator to neutral position and with it arrest of its own movement. As here proportioned, however, the movement imparted to the actuator 97, even by movement of the piston 82 through the full half length of the cylinder 81, is not very great. The result is that only for small departures in correspondence of position of the control and the controlled members is the controller 77 capable of restoring the regulator to neutral position prior to the reaching of the end of the cylinder by the piston 82. Further, it is only during such small departures from correspondence of position of the control and the controlled members that the transmission operates at a rate proportional to the departure from correspondence of positions. For any departure beyond that mentioned, the transmission will always operate at full rate. The result is a maximum rate of movement of the controlled member for the maximum period of time so as to cover maximum distances in a minimum period of time, while at the same time preventing overrunning of the member through making its rate of movement proportional to departure from correspondence of position of the members as the controlled member approaches its desired position.

*Operation*

While it is believed that the operation of the system will be readily understood from the foregoing, a brief statement of the operation will undoubtedly be a help in understanding the invention. The operator wishing to control the member 10 will stand at the master station MS and grasp the control member 13 at the upper free end thereof. Normally, the control member 13 seeks a position with the shaft 24 in intermediate or neutral position and with the shaft 18 at an extreme position. By retaining the control member 13 with the shaft 24 in neutral position, the operator may shift the control member 13 to the left, as viewed in Fig. 2, any desired amount within the provided limits and thereby rock the shaft 18. Such rocking of the shaft 18 results in rotation of the armature of the transmitter 35 and brings about a corresponding rotation of the armature of the receiver 38. Such rotation of the armature of the receiver 33 is transformed into linear movement of the element 49 which then pivots the link 65 and moves the jet pipe 54 of the regulator 53 away from neutral position. This results in a shift of the valve element 60 and a supply of actuating fluid to the cylinder 46 constituting the power means 45 for actuating the controlled member in one of its basic directions of movement. The linkage system 52 is so designed that the movement of the piston 47 counteracts the effect on the regulator of movement of the element 49 and thus when the controlled member 10 reaches the position corresponding exactly to the position of the control member 13 the regulator 53 is restored to neutral and the motor 45 has been brought to rest.

Similarly, the operator may retain the shaft 18 stationary while actuating the control member 13 to rock the shaft 24 and thus bring about the creation of a signal at the control means 17 calling for drive of the member 10 by the power means 15. If it be assumed that the movement of the control member 13 is small so that there is only a small departure from correspondence in position of the control and the controlled members, the power means will drive the member at a rate proportional to the degree of departure. In somewhat greater detail, the control means will function in this manner: let it be assumed that the element 95 is shifted downwardly, as viewed in Fig. 3. This will result in generally upward movement of the actuator 98, the link 92 and the link 93 being stationary at the instant of initial movement of the control member 13. With such upward movement of the actuator 98, the regulator 76 now causes upward movement of the piston 82, placing the transmission in operation and pivoting the link 110 in a clockwise direction about its fulcrum 112. With the element 95 now held stationary, the pivoting of the link 110 as well as the counterclockwise rotation of the arm 101 which results from operation of the transmission acting through the linkage unit 92 serves to restore the jet pipe 78 to neutral position bringing the piston 82 to rest. Under the assumed condition of comparatively small movement of the control member 13, the influence of the controller 77 predominates and is sufficient to arrest the piston 82 before it reaches the end of the cylinder. The rate of operation of the transmission, therefore, will be proportional to the departure from corresponding position of the members, initially the movement of the control member 13.

As the transmission continues to drive the member 10, the arm 101 will continue to move in the same direction as before and thus, through the linkage unit 92, will pivot the jet pipe 78 to the opposite side of neutral thereby causing a return of the piston 82 toward its normal or intermediate position. With any return of the piston 82 towards its normal or intermediate position, the actuator 97 is, of course, shifted upwardly thereby tending to restore the jet pipe 78 to neutral position. These opposing actions on the actuator 97 of the controlled member 10 and the piston 82 continue with the rate of movement of the member 10 constantly decreasing, due to gradual return of the transmission to zero output with return of the piston 82 to neutral position, until the member 10 reaches the position corresponding to that taken by the control member 13.

Where the departure in correspondence of positions of the control and the controlled members, such, for example, as by initial large movement of the control member 13, is greater than the small departure that can be offset by movement of the piston 82 alone, the operation is the same save that the movement imparted to the actuator 97 by movement of the piston 82 to the end of the cylinder 81 is not sufficient to offset the movement of the actuator 97 in the opposite direction caused by a departure in correspondence of position of the control and the controlled members. The result, of course, is that the transmission now operates at maximum rate and continues so to operate until the movement imparted to the member 10, as reflected in the linkage system 90, is sufficient, when coupled with the movement of the piston 82 as reflected in the linkage system 110, to restore the jet pipe 78 to and beyond neutral position. When that point is reached, the system then operates as above described to progressively reduce the rate of operation of the transmission and hence the rate of movement of the member 10 until all movement is arrested when the member reaches the called-for position.

Obviously, it is not necessary that the control member 13 be so moved that the controlled member 10 moves only in one basic direction at any given time, but may be so moved that the controlled member 13 will be both rotated about its axis 11 and swung about its axis 12 at one and the same time.

We claim as our invention:

1. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a part located at the remote station duplicating at the remote station movements of said control member, means for duplicating at the remote station movements of said controlled member reduced to the proportions of the duplicated movements of said control member, and means to control the operation of said power means including a regulator having a neutral position, extreme positions of adjustment on either side of neutral producing maximum rate of operation of said power means and positions intermediate the extreme positions producing a rate of operation proportional to the departure from neutral, and an adjusting system for said regulator responsive to the movements and indicated positions of said members adjusting said regulator to extreme position for all but small departures from correspondence in the positions of said members.

2. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a part located at the remote station duplicating at the remote station movements of said control member, means for duplicating at the remote station movements of said control member reduced to the proportions of the duplicated movements of said control member, a motor for adjusting said power means to various output rates, a regulator for governing said motor, and a linkage system connected to both members to be responsive to the positions thereof, to said motor and to said regulator, said linkage system for small departures from correspondence in the positions of said members adjusting said regulator within its limits to obtain a rate of operation of said power means proportional to the departure from correspondence in the positions and for all but small departures adjusting said regulator to the extreme of its limits to obtain maximum rate of operation of said power means.

3. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a part located at the remote station duplicating at the remote station movements of said control member, means for duplicating at the remote station movements of said controlled member reduced to the proportions of the duplicated movements of said control member, a hydraulic motor for adjusting said power means to various output rates, a hydraulic type regulator for governing said motor, and a linkage system connected to both members to be responsive to the positions thereof, to said motor and to said regulator, said linkage system for small departures from correspondence in the positions of said members adjusting said regulator within its limits to obtain a rate of operation of said power means proportional to the departure from correspondence in the positions and for all but small departures adjusting said regulator to the extreme of its limits to obtain maximum rate of operation of said power means.

4. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a part located at the remote station duplicating at the remote station movements of said control member, means for duplicating at the remote station movements of said controlled member reduced to the proportions of the duplicated movements of said control member, a hydraulic motor for adjusting said power means to various output rates, a pivoted jet-pipe type regulator for governing said motor, and a linkage system for controlling said regulator comprising a first linkage unit connected to said regulator and actuated by said members to urge said regulator to neutral position when said members assume corresponding positions, and a second linkage unit connected to said first linkage unit and acting on said regulator through said first linkage unit and actuated by said motor to produce a premature return of said regulator to neutral position.

5. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a part located at the remote station duplicating at the remote station movements of said control member, means for duplicating at the remote station movements of said controlled member reduced to the proportions of the duplicated movements of said control member, a hydraulic motor for adjusting said power means to various output rates, a pivoted jet-pipe type regulator for governing said motor, and a linkage system for controlling said regulator comprising a first linkage unit actuating said regulator and actuated by said members to urge said regulator to neutral position when said members assume corresponding positions, said first linkage unit including an actuator for the jet-pipe of said regulator, and a second linkage unit acting on said regulator through said first linkage unit and actuated by said motor to move said jet-pipe actuator in a direction opposite to the movement imparted thereto by departure of said members from correspondence in position.

6. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a linearly movable part located at the remote station duplicating movements of said control member, means for duplicating at the remote station movements of said controlled member reduced to linear movement of the proportions of the duplicated movements of said control member, a piston and cylinder type hydraulic motor for adjusting said power means to various output rates, a pivoted jet-pipe type regulator for governing said motor, and a linkage system for controlling said regulator comprising a first linkage unit actuating said regulator and actuated by said linearly movable part and the reduced movements of said controlled member to urge said regulator to neutral position when said members assume corresponding positions, said first linkage unit including an actuator link for the jet-pipe of said regulator, and a second linkage unit acting on said regulator through said first linkage unit and actuated by said motor to move said jet pipe actuator link in a direction opposite to the movement imparted thereto by departure of said members from correspondence in position, said second linkage unit being operable even upon movement of said motor to the extreme in either direction to move said jet pipe actuator link but a small fraction of the movement imparted thereto by maximum departure of said members from correspondence in their positions.

7. In a remote control system a control member located at a master station, a member to be controlled located at a remote station, said controlled member being mounted to duplicate the movements of said control member, power means for imparting movement to said controlled member, and apparatus for governing said power means to cause said controlled member to assume positions corresponding to the positions of said control member comprising, in combination, means having a part located at the master station and a linearly movable part located at the remote station duplicating movements of said control member, means for duplicating at the remote station movements of said controlled member reduced to the proportions of the duplicated movements of said control member including a generally linearly movable part, a piston and cylinder type hydraulic motor for adjusting said power means to various output rates, a pivoted jet-pipe type regulator for governing said motor, and a linkage system for controlling said regulator comprising a jet pipe actuator link, a second link pivotally connected at one end to said actuator link and at the other end to said linearly movable part, a third link pivotally connected at one end to the generally linearly movable part and disposed generally parallel with said second link, said second and third links being each pivotally mounted intermediate its ends on a bar slidable in a direction generally transversely of said links pivoted thereto, and a fourth link fulcrumed intermediate its ends and pivotally connected at one end to be moved by said motor and pivotally connected at its remaining end to the remaining end of said third link.

8. In a remote control system a control member located at a master station, a member to be controlled located at a remote station, said controlled member being mounted to duplicate the movements of said control member, power means for imparting movement to said controlled member to assume positions corresponding to the positions of said control member comprising, in combination, a rotary multiple phase voltage changing transmitter located at the master station adapted to transmit a signal conforming to the movement of said control member, a rotary multiple phase voltage changing receiver located at the remote station duplicating certain movements of said control member, means for duplicating at the remote station movements of said controlled member reduced to the proportions of the duplicated movements of said control member, a motor for adjusting said power means to various output rates, a regulator for governing said motor, and a linkage system connected to both members to be responsive to the positions thereof, to said motor and to said regulator, said linkage system for all but small departures from correspondence in the positions of said members adjusting said regulator to the extreme of its limits to obtain maximum rate of operation of said power means, small departures from correspondence in the positions of said members adjusting said regulator within its limits to obtain a rate of operation of said power means proportional to the departure from correspondence in the positions of said members.

9. In a remote control system a control member located at a master station, a member to be controlled located at a remote station, said controlled member being mounted to duplicate the movements of said control member, power means for imparting movement to said controlled member to assume positions corresponding to the positions of said control member comprising, in combination, a self-synchronous transmitter located at the master station adapted to transmit a signal conforming to the movement of said control member, a self-synchronous receiver located at the remote station duplicating certain movements of said control member, means for duplicating at the remote station movements of said controlled member reduced to the proportions of the duplicated movements of said control member, a motor for adjusting said power means to various output rates, a regulator for governing said motor, and a linkage system responsive to the position of both members and to said motor controlling said regulator so as to obtain maximum rate of operation of said power means for all but small departures from correspondence in the positions of said members, the rate of operation for small departures being proportional to the departure from correspondence in the positions, a hydraulic motor for adjusting said power means to various output rates, a pivoted jet-pipe type regulator for governing said motor, and a linkage system for controlling said regulator comprising a first linkage unit actuating said regulator and actuated by said members to urge said regulator to neutral position when said members assume corresponding positions, said first linkage unit including an actuator for said jet pipe, and a second linkage unit acting on said regulator through said first linkage unit and actuated by said motor to move said jet pipe actuator in a direction opposite to the movement imparted thereto by departure of said members from correspondence in position.

10. In a remote control system a control member located at a master station, a member to be controlled located at a remote station, said controlled member being mounted to duplicate the movements of said control member, power means for imparting movement to said controlled member and apparatus for governing said power means to cause said controlled member to assume positions corresponding to the positions of said control member comprising a self-synchronous transmitter actuated by said control member, a self-synchronous receiver located at the remote station electrically coupled to said transmitted and converting the signal of said transmitter into movement of a linearly movable part, means for duplicating at the remote station movements of said controlled member reduced to the proportions of the duplicated movements of said control member including a generally linearly movable part, a piston and cylinder type hydraulic motor for adjusting said power means to various output rates, a pivoted jet-pipe type regulator for governing said motor, and a linkage system for controlling said regulator comprising a jet pipe actuator link, a second link pivotally connected at one end to said actuator link and at the other end to said linearly movable part, a third link pivotally connected at one end to the generally linearly movable part and disposed generally parallel with said second link, said second and third links being each pivotally mounted intermediate its ends on a bar slidable in a direction generally transversely of said links pivoted thereto, and a fourth link fulcrumed intermediate its ends and pivotally connected at one end to be moved by said motor and pivotally connected at its remaining end to the remaining end of said third link.

11. In a remote control system a control member located at a master station, a member to be controlled located at a remote station, said controlled member being mounted to duplicate the movements of said control member, a hydraulic transmission for imparting movement in opposite directions to said controlled member including a control element adjustable in opposite directions from a neutral position to determine the direction and rate at which said transmission drives said controlled member, and apparatus for governing said transmission to cause said controlled member to assume positions corresponding to the positions of said control member comprising, in combination, electrical means having a part located at the master station and a part located at the remote station duplicating at the remote station movements of said control member, means for duplicating at the remote station movements of said controlled member reduced to the proportions of the duplicated movements of said control member, a reversible motor, movement transforming and transmitting means interposed between said motor and the control element of said transmission adapting said motor for control of said transmission, a regulator for controlling said motor having a neutral position and extreme positions on opposite sides of neutral and causing said transmission to operate at a maximum rate when in either extreme position, and a linkage system for controlling said regulator connected to both members, to said motor and to said regulator, said linkage system adjusting said regulator to extreme position for all but small departures of said members from correspondence in the positions thereof, said regulator during small departures from correspondence in the positions of said members being adjusted to positions proportional to the extent of departure from the correspondence in the positions of said members, the direction of operation of said transmission being such as to cause said controlled member to follow said control member.

HERBERT ZIEBOLZ.
DANIEL T. GUNDERSEN.
ROBERT K. BAETZMANN.

REFERENCES CITED

The following references are of record in the file of this patent:

UNITED STATES PATENTS

| Number | Name | Date |
|---|---|---|
| 2,047,922 | Seligmann | July 14, 1936 |
| 2,213,968 | Rose | Sept. 10, 1940 |
| 2,363,179 | Harrington | Nov. 21, 1944 |
| 2,409,190 | Brown | Oct. 15, 1946 |